United States Patent
Kwon et al.

(10) Patent No.: US 9,635,611 B2
(45) Date of Patent: Apr. 25, 2017

(54) COMMUNICATION METHOD OF A TRANSMISSION APPARATUS AND A RECEPTION APPARATUS

(71) Applicant: Samsung Electronics Co., Ltd., Suwon-si (KR)

(72) Inventors: Ui Kun Kwon, Hwaseong-si (KR); Young Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/602,798

(22) Filed: Jan. 22, 2015

(65) Prior Publication Data

US 2015/0163742 A1 Jun. 11, 2015

Related U.S. Application Data

(63) Continuation of application No. 13/043,674, filed on Mar. 9, 2011, now Pat. No. 8,964,613.

(60) Provisional application No. 61/412,489, filed on Nov. 11, 2010.

(30) Foreign Application Priority Data

| Mar. 9, 2010 | (IN) | ............................. 622/CHE/2010 |
| Aug. 17, 2010 | (IN) | ........................... 2361/CHE/2010 |
| Feb. 7, 2011 | (KR) | ........................ 10-2011-0010524 |

(51) Int. Cl.
  *H04W 52/02* (2009.01)

(52) U.S. Cl.
  CPC ... *H04W 52/0222* (2013.01); *H04W 52/0235* (2013.01); *Y02B 60/50* (2013.01)

(58) Field of Classification Search
  None
  See application file for complete search history.

(56) References Cited

U.S. PATENT DOCUMENTS

| 7,733,835 | B2 | 6/2010 | Sammour et al. |
| 8,619,753 | B1 * | 12/2013 | Liu et al. .......... H04W 72/1257 |
| | | | 370/322 |
| 2005/0213534 | A1 | 9/2005 | Benveniste |
| 2006/0252443 | A1 | 11/2006 | Sammour et al. |
| 2007/0115905 | A1 | 5/2007 | Jokela et al. |
| 2007/0191052 | A1 | 8/2007 | Kneckt et al. |

(Continued)

FOREIGN PATENT DOCUMENTS

| JP | 2008-539665 A | 11/2008 |
| JP | 2008-544617 A | 12/2008 |

(Continued)

OTHER PUBLICATIONS

International Search Report issued Oct. 27, 2011, in counterpart International Application No. PCT/KR2011/001639 (3pp).

(Continued)

*Primary Examiner* — Diane Lo
(74) *Attorney, Agent, or Firm* — NSIP Law

(57) ABSTRACT

Provided is a communication method of a reception apparatus and a transmission apparatus that may decrease consumption of power by changing an operation state of a corresponding reception apparatus from an awake state to a sleep state when a stream to be transmitted is absent during all or a portion of a transmission opportunity (TXOP).

12 Claims, 7 Drawing Sheets

(56) References Cited

U.S. PATENT DOCUMENTS

| | | | |
|---|---|---|---|
| 2007/0201468 A1* | 8/2007 | Jokela | H04L 12/18 |
| | | | 370/390 |
| 2007/0230378 A1 | 10/2007 | Tavares et al. | |
| 2008/0095091 A1 | 4/2008 | Surineni et al. | |
| 2008/0291858 A1 | 11/2008 | Kandala et al. | |
| 2009/0122768 A1 | 5/2009 | Nakashima et al. | |
| 2009/0310692 A1 | 12/2009 | Kafle et al. | |
| 2011/0110282 A1* | 5/2011 | Wu et al. | H04W 52/0235 |
| | | | 370/311 |
| 2011/0110349 A1* | 5/2011 | Grandhi | 370/338 |
| 2011/0194475 A1* | 8/2011 | Kim et al. | 370/311 |

FOREIGN PATENT DOCUMENTS

| | | |
|---|---|---|
| JP | 2009-165131 A | 7/2009 |
| JP | 2009-531947 A | 9/2009 |
| JP | 2010-507349 A | 3/2010 |
| JP | 2013-513285 A | 4/2013 |
| KR | 10-2005-0057124 A1 | 6/2005 |
| KR | 10-2006-0131049 A1 | 12/2006 |
| KR | 10-2007-0097282 A | 10/2007 |
| KR | 10-2008-0014422 A1 | 2/2008 |
| KR | 10-2008-0066074 A | 7/2008 |
| KR | 10-2009-0082227 A | 7/2009 |
| WO | WO 2006/115999 A2 | 11/2006 |
| WO | WO 2007/085948 A2 | 8/2007 |

OTHER PUBLICATIONS

Extended European Search Report issued by the European Patent Office on Apr. 7, 2014 in the corresponding European Patent Application No. 11753611.0 (11 pages in English).
Japanese Office Action issued Sep. 30, 2014, in counterpart Japanese Application No. JP 2012-556978 (3 pages in Japanese, 4 pages in English).
Robert Stacey, et al., "Specification Framework for TGac" [online], IEEE 802.11-09/0992r16, < URL:https://mentor.ieee.org/802.11/dcn/09/11-09-0992-16-00ac-proposed-specification-framework-for-tgac.doc>, Nov. 9, 2010.
Patil Sandhya, et al., "Downlink TXOP Power Save" [online], IEEE 802.11-11/0091r0, <URL:https://mentor.ieee.org/802.11/dcn/11/11-11-0091-00-00ac-dl-txop-ps-protocol.pptx >, Jan. 17, 2011.
Japanese Office Action issued on Jun. 28, 2016 in counterpart Japanese Application No. 2015-150383. (7 pages in Japanese with English translation).
Korean Office Action issued Jan. 5, 2017 in corresponding Korean Patent Application No. 10-2011-0010524 (10 Pages with English translation).

* cited by examiner

COMMUNICATION METHOD OF A TRANSMISSION APPARATUS AND A RECEPTION APPARATUS

CROSS-REFERENCE TO RELATED APPLICATION(S)

This present application is a continuation of U.S. patent application Ser. No. 13/043,674 filed Mar. 9, 2011, which claims the benefit under 35 U.S.C. §119(e) of U.S. Provisional Application No. 61/412,489, filed on Nov. 11, 2010, in the U.S. Patent and Trademark Office, and claims the benefit under 35 U.S.C. §119(a) of India Patent Application No. 622/CHE/2010, filed Mar. 9, 2010, and No. 2361/CHE/2010, filed on Aug. 17, 2010, in the Intellectual Property Office of India, and Korean Patent Application No. 10-2011-0010524, filed on Feb. 7, 2011, in the Korean Intellectual Property Office, the entire disclosures of which are incorporated herein by reference for all purposes.

BACKGROUND

1. Field

The following description relates to a communication method and a transmission apparatus and a reception apparatus.

2. Description of Related Art

Mobile terminals such as smart phones allow a user to simultaneously perform a variety of functions, for example, making a call, playing a motion picture, playing back a music file, viewing a digital multimedia broadcasting (DMB), a digital camera function, Bluetooth, wireless Internet access, and the like, using a single device.

In addition, as the data rate of a mobile communication networks, Bluetooth, wireless Internet, and the like, increases, power consumption of a terminal may also increase. Accordingly, there is a desire for a communication method that may employ a high capacity battery for a terminal, and may decrease power consumption by the terminal.

SUMMARY

In one general aspect, there is provided a communication method of a reception apparatus operating in an active mode, the method including setting a power management mode to a power saving mode during a transmission opportunity (TXOP), receiving information transmitted from a transmitting apparatus, and determining an operation state of the reception apparatus by determining whether a predetermined criterion is satisfied based on the information received from the transmission apparatus, wherein streams corresponding to one or more reception apparatuses are simultaneously transmitted from the transmission apparatus during the TXOP.

The determining may comprises changing the operation state of the reception apparatus from an awake state to a sleep state, in response to the predetermined criterion being satisfied based on information transmitted from the transmission apparatus.

The information transmitted from the transmission apparatus may comprise at least one of a group identifier (ID) of a group comprising the reception apparatus, information about whether there is a stream of data to be transmitted to the reception apparatus from the transmission apparatus during the TXOP, and information indicating whether there is an additional stream to be transmitted to the reception apparatus.

The predetermined criterion may comprise a first criterion, a second criterion, and a third criterion, if the reception apparatus is not included in the group of the group ID, the first criterion may be satisfied, if the reception apparatus is included in the group of the group ID, and there is no stream of data to be transmitted to the reception apparatus from the transmission apparatus during the TXOP, the second criterion may be satisfied, and if an indicator indicating that there is no additional stream to be transmitted to the reception apparatus during the TXOP is received, the third criterion may be satisfied.

The method may further comprise selectively determining whether to change the operation state of the reception apparatus based on the first criterion and the second criterion, using an enabling bit included in each of frames transmitted from the transmission apparatus.

The method may further comprise transmitting, to the transmission apparatus, a frame in which the power management mode is set to the power saving mode, in response to the reception apparatus desiring to operate in the power saving mode, and receiving, from the transmission apparatus, an acknowledgement (ACK) as a response to the frame in which the power management mode is set to the power saving mode, wherein the setting comprises setting the power management mode to the power saving mode in the TXOP duration in response to the received ACK.

The method may further comprise receiving, from the transmission apparatus, a TXOP setting frame comprising information associated with the TXOP duration, wherein the TXOP setting frame is generated to be decodable by both a reception apparatus having set the power management mode to the power saving mode, and a reception apparatus having not set the power management mode to the power saving mode.

The method may further comprise determining whether the reception apparatus is capable of receiving the stream based on the TXOP setting frame, and transmitting a response frame with respect to the TXOP setting frame based on the determination result.

The method may further comprise maintaining the operation state of the reception apparatus to be in a sleep state for the remainder of the TXOP duration after terminating receiving of a corresponding stream based on the indicator, or after transmitting a block ACK with respect to the corresponding stream.

In another aspect, there is provided a communication method of a transmission apparatus, the method including obtaining a transmission opportunity (TXOP) with respect to a channel, maintaining streams corresponding to reception apparatuses having an active mode as a power management mode, transmitting information used to determine an operation state of each of the reception apparatuses, and simultaneously transmitting the streams to at least one of the reception apparatuses during the TXOP.

The information used to determine the operation state of each of the reception apparatuses may comprise at least one of a group identifier (ID) of a group comprising each of the reception apparatuses, information about whether there is a stream of data to be transmitted to the respective reception apparatuses from the transmission apparatus during the TXOP, and information indicating whether there is an additional stream to be transmitted to the respective reception apparatuses.

The method may further comprise receiving a frame in which the power management frame is set to the power saving mode, from a reception apparatus desiring to operate in the power saving mode from among the reception apparatuses that have the active mode as the power management mode, and transmitting, to the reception apparatus, an acknowledgement (ACK) with respect to the frame in which the power management mode is set to the power saving mode.

The method may further comprise suspending a transmission of a stream corresponding to a reception apparatus that satisfies a predetermined criterion, so that the reception apparatus satisfying the predetermined criterion maintains the operation state to be in a sleep state for an amount of remaining time in the TXOP.

The predetermined criterion may comprise a first criterion, a second criterion, and a third criterion, if the reception apparatus is not included in a group of a group ID, the first criterion may be satisfied, if the reception apparatus is included in the group of the group ID, and when there is no stream of data to be transmitted to the reception apparatus from the transmission apparatus during the TXOP, the second criterion may be satisfied, and if an indicator indicating that there is no additional stream to be transmitted to the reception apparatus during the TXOP is received, the third criterion is satisfied.

The method may further comprise transmitting a frame comprising an enabling bit enabling a reception apparatus to selectively determine whether to change the operation state of the reception apparatus based on the first criterion and the second criterion.

The method may further comprise generating an indicator indicating that there is no additional stream to be transmitted to a reception apparatus during the TXOP.

The generating may comprise generating the indicator indicating that there is no additional stream to be transmitted to the reception apparatus using a preamble of a packet transmitted to the reception apparatus or a header of a media access control (MAC) frame transmitted to the reception apparatus.

The method may further comprise a buffering a stream to be transmitted to a reception apparatus in the sleep state when the stream to be transmitted to the reception state occurs during the remaining time of the TXOP.

The method may further comprise transmitting, to the reception apparatuses, a TXOP setting frame including information associated with the TXOP duration, wherein the TXOP setting frame is generated to be decodable by both a reception apparatus having set the power management mode to the power saving mode, and a reception apparatus having not set the power management mode to the power saving mode.

In another aspect, there is provided a computer-readable storage medium comprising program instructions to cause a computer to implement a method including setting a power management mode to a power saving mode during a transmission opportunity (TXOP), receiving information transmitted from a transmitting apparatus, and determining an operation state of the reception apparatus by determining whether a predetermined criterion is satisfied based on the information received from the transmission apparatus, wherein streams corresponding to one or more reception apparatuses are simultaneously transmitted from the transmission apparatus during the TXOP.

In another aspect, there is provided a reception apparatus capable of determining a power management mode to operate in during a transmission opportunity (TXOP) of a transmission apparatus, the reception apparatus including a controller configured to determine whether the reception apparatus is to operate in a power saving mode (TXOP PS mode) and a non-power saving mode (non-TXOP PS mode), and a transmitter configured to transmit a frame to the transmission apparatus in which the frame indicates whether the reception apparatus desires to operate in the TXOP PS mode or the non-TXOP PS mode.

In response to determining that the reception apparatus is to operate in TXOP PS mode, the controller may set a power management field of the frame to indicate that the reception apparatus desires to operate in TXOP PS mode.

The frame may be an association request frame, and the controller may set a capabilities/support field of the association request frame to indicate whether the reception apparatus desires to operate in TXOP PS mode or in non-TXOP PS mode.

The reception apparatus may further comprise a receiver configured to receive an acknowledgment (ACK) from the transmission apparatus in response to the association request frame transmitted from transmitter.

If the receiver receives the ACK from the transmission apparatus, the controller may set the power management mode of the reception apparatus to the TXOP PS mode, and if the receiver does not receive the ACK from the transmission apparatus, the controller may set the power management mode of the reception apparatus to the non-TXOP PS mode.

In another aspect, there is provided a transmission apparatus for transmitting data to a plurality of terminals during a transmission opportunity (TXOP), the transmission apparatus including a receiver configured to receive a frame in which a power management mode is set to a power saving mode (TXOP PS mode), a controller configured to determine if the transmission apparatus is capable of supporting the TXOP PS mode, and a transmitter, in response to determining that the transmission apparatus is capable of supporting the TXOP PS mode, configured to transmit an acknowledgment message to the reception apparatus.

The frame may be an association request frame, and a capabilities/support field of the association request frame may be set to indicate that the reception apparatus desires to operate in TXOP PS mode.

Other features and aspects may be apparent from the following detailed description, the drawings, and the claims.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Figure 1:
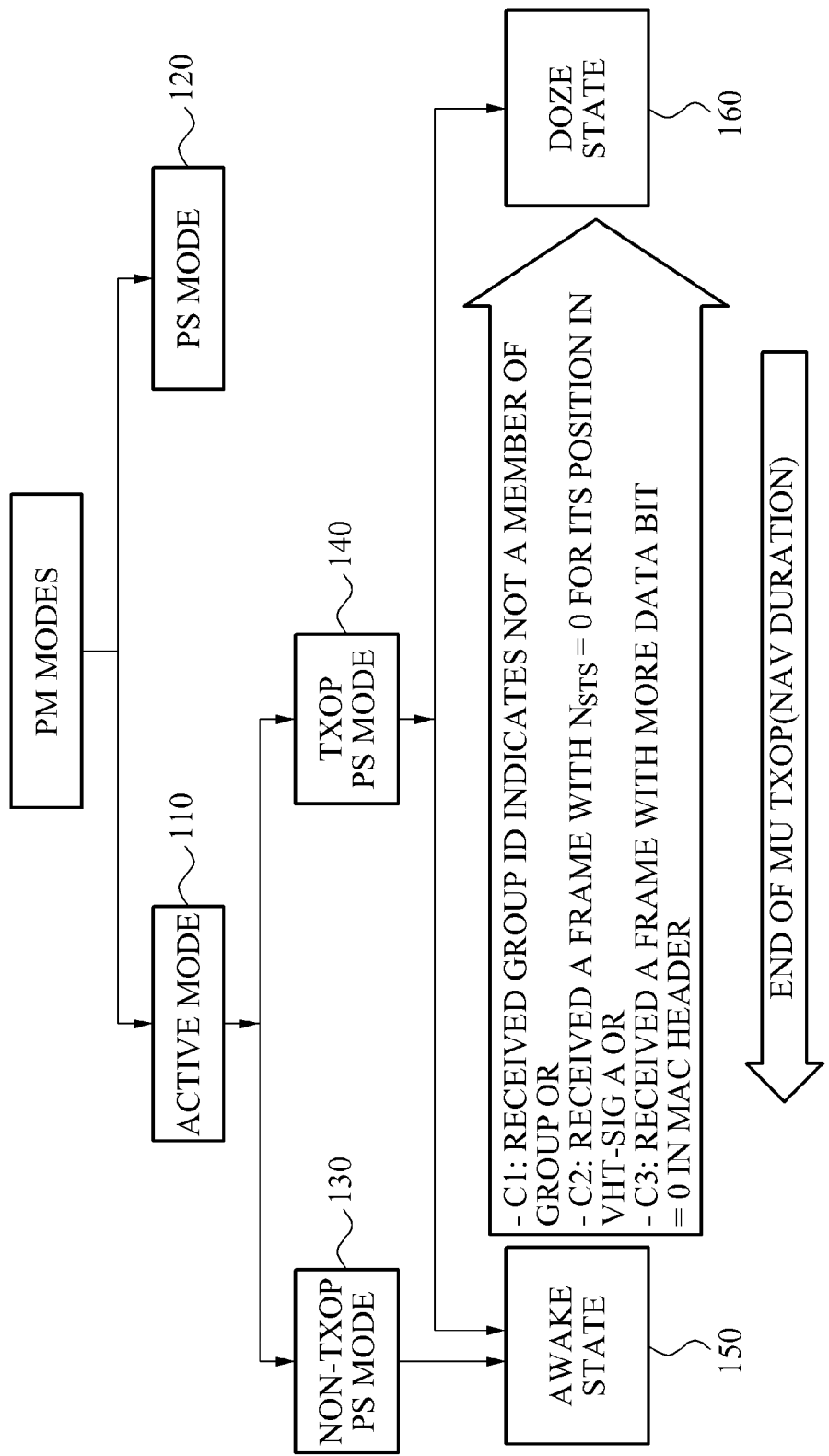
FIG. 1 is a diagram illustrating an example of a reception apparatus operating in a transmission opportunity (TXOP) power saving mode.

FIG. 1 illustrates an example of a reception apparatus operating in a transmission opportunity (TXOP) power saving mode.

At least one reception apparatus receiving data from a transmission apparatus may maintain an active mode in order to receive a packet or a frame transmitted to the at least one reception apparatus. For example, the reception apparatus may be a mobile terminal and the transmission apparatus may be an access point. The reception apparatus may remain in active mode. For example, even though there is no packet to be transmitted to the reception apparatus, the reception apparatus may remain in the active mode in order to overhear a packet to be transmitted to another terminal.

The reception apparatus described herein may support various protocol, for example, an IEEE 802.11 protocol such as IEEE 802.11ac, IEEE 802.11n, and the like.

If there is no transmission of data corresponding to the reception apparatus, or when the transmission of data to the reception apparatus is completed, it is possible to save power, for example, receive standby time and receive standby power by adjusting an operation mode of the corresponding reception apparatus. For example, the reception apparatus may switch from an awake state to a sleep state or a doze state.

Referring to FIG. 1, a power management mode of reception apparatuses may include an active mode 110 and a power saving (PS) mode 120. While in the active mode 110, the reception apparatus may enter into two power management modes, a non-power save mode (non-TXOP PS mode) in which the reception apparatus stays awake, and a power save mode (TXOP PS mode) in which the reception apparatus may switch between an awake state 150 and doze state 160.

The active mode 110 may correspond to a state in which the reception apparatus may be continuously operating to transmit and receive data to and from a transmission apparatus. The PS mode 120 may be a state, for example, an idle state in which the reception apparatus does not operate or otherwise reduces overall power consumption.

In this example, the reception apparatuses operating in the active mode 110 may be divided into reception apparatuses operating in a non-TXOP PS mode 130 and reception apparatuses operating in a TXOP PS mode 140.

The reception apparatuses operating in the non-TXOP PS mode 130 may maintain an awake state without a separate operation for the power saving. Accordingly, the reception apparatuses operating in the non-TXOP PS mode 130 may continuously consume power for a receive standby time used to wait for receiving a packet to be transmitted to corresponding reception apparatuses.

The reception apparatuses operating in the TXOP PS mode 140 may change an operation state to an awake state 150 or to a sleep state such as a doze state 160, depending on whether a predetermined criterion is satisfied.

For example, a predetermined criterion may be satisfied if an identifier (ID) of a corresponding reception apparatus is not included in a group of a group ID included in a preamble of a frame received from the transmission apparatus. As another example, a predetermined criterion may be satisfied if the ID of the corresponding reception apparatus is included in the group of the group ID, however, a number of state time space ($N_{STS}$) included in a very high throughput signal (VHT-SIG) field of the received frame is set to '0' to indicate that the transmission apparatus does not have data to transmit to the reception apparatus during the TXOP. As another example, a predetermined criterion may be satisfied if a 'more data bit (MDB)' included in a Media Access Control (MAC) header of the received frame is '0', and the like.

For example, the criterion that the $N_{STS}$ included in the VHT-SIG field of the received frame is '0' may indicate that there is no data or a stream that is to be transmitted to the reception apparatus.

It should be appreciated throughout these examples that the bit values are merely for purposes of example, and that any bit value may be used.

The criterion that the MDB included in the MAC header of the received frame is '0' may indicate that no more additional streams corresponding to the reception apparatus are to be transmitted during the TXOP, that is, that transmission of the stream corresponding to the corresponding reception apparatus is completed. In this example, the group ID may indicate that the reception apparatus is included in the group, and the $N_{STS}$ field may indicate that the transmission apparatus has data to transmit to the reception apparatus. The MDB included in the MAC header may be set to indicate that the transmission apparatus has completed transmitting data to the reception apparatus during the TXOP.

A reception apparatus satisfying any one of the aforementioned criterion may save the receive standby power for the remainder of the TXOP duration by changing an operation state of the reception apparatus from the awake state 150 to the doze state 160. The TXOP duration may indicate a time duration corresponding to a TXOP with respect to a channel obtained by the transmission apparatus.

For example, the reception apparatus operating in the TXOP PS mode 140 may save receive standby power and decrease power consumption of the reception apparatus by changing the operation state for the remainder of the TXOP duration based on the predetermined criterion.

Hereinafter, the TXOP PS mode 140 is referred to as a power saving mode.

The reception apparatus may notify the transmission apparatus about a power management mode of the terminal using a VHT control field of a MAC header. For example, the power management mode may be the power saving mode 120, the non-TXOP PS mode 130, or the TXOP PS mode 140. The reception apparatus may use one or more bits of the control field to indicate which power saving mode the reception apparatus is in.

Figure 2:
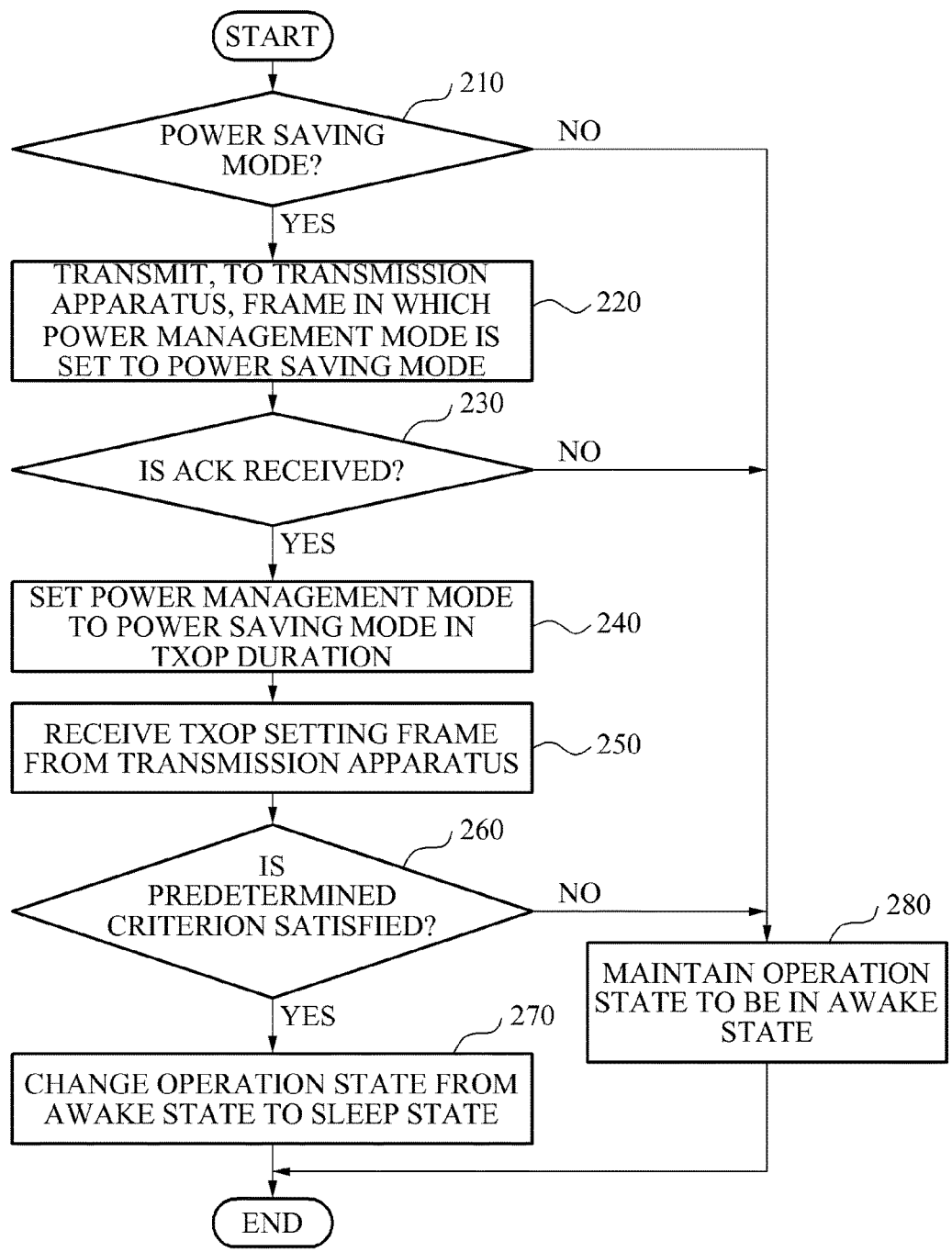
FIG. 2 is a flowchart illustrating an example of a communication method of a reception apparatus.

FIG. 2 illustrates an example of a communication method of a reception apparatus.

For example, the reception apparatus may be one reception apparatus from among a plurality of reception apparatuses that operate in an active mode. During a TXOP, streams corresponding to the reception apparatuses may be simultaneously transmitted from a transmission apparatus.

In 210, the reception apparatus determines to operate in a power saving mode. In response to determining to operate in the power saving mode, in 220 the reception apparatus transmits, to the transmission apparatus, a frame in which a power management mode is set to the power saving mode.

For example, the power management mode may be set to the power saving mode by setting a field or a bit to a value indicating whether the power saving mode is used in a frame transmitted to the transmission apparatus.

Conversely, when it is determined that the reception apparatus is not to operate in the power saving mode, for example, when the reception apparatus determines to operate in the non-TXOP PS mode 130 of FIG. 1, the reception apparatus may maintain the operation state as the awake state, in 280.

In 230, the reception apparatus determines whether an acknowledgement (ACK) is received from the transmission apparatus in response to the frame in which the power management mode is set to the power saving mode.

When the ACK is not received from the transmission apparatus in 230, the reception apparatus maintains the operation state as the awake state, in 280. For example, when the ACK is not received from the transmission apparatus, the reception apparatus may not operate in the power saving mode.

When the ACK is received from the transmission apparatus, the reception apparatus sets the power management mode to the power saving mode in the TXOP duration, in 240.

In 250, the reception apparatus receives, from the transmission apparatus, a TXOP setting frame including information associated with the TXOP duration.

For example, the TXOP setting frame may be generated to be decodable by both a reception apparatus having set the power management mode to the power saving mode, and a reception apparatus having not set the power management mode to the power saving mode.

A period in which the reception apparatus may receive the TXOP setting frame may not be limited by the aforementioned order, and thus, may be changed for a process of communicating with the transmission apparatus.

In this example, the reception apparatus may determine whether the reception apparatus corresponds to a reception apparatus that is to receive a corresponding stream based on the TXOP setting frame received from the transmission apparatus. Based on the determination result, the reception apparatus may transmit, to the transmission apparatus, a response frame with respect to the TXOP setting frame.

In 260, the reception apparatus may determine whether a predetermined criterion is satisfied based on information transmitted from the transmission apparatus. The reception apparatus may determine the operation state of the reception apparatus by determining whether the predetermined criterion is satisfied.

For example, information transmitted from the transmission apparatus may include at least one of a group ID of a group including the reception apparatus, information about whether a data stream corresponding to the reception apparatus is to be transmitted from the transmission apparatus during the TXOP, and information indicating whether there is an additional stream to be transmitted to the reception apparatus.

For example, the predetermined criterion may include a first criterion, a second criterion, and a third criterion. If any one of the criterion are satisfied, the reception apparatus may switch from an awake state to a doze state for the remainder of the duration of the TXOP of the transmission apparatus.

For example, if the reception apparatus is not included in the group of the group ID which includes a set of reception apparatuses within a corresponding cell, the first criterion may be satisfied.

As another example, if the reception apparatus is included in the group of the group ID, but a stream corresponding to the reception apparatus is not to be transmitted from the transmission apparatus during the TXOP, the second criterion may be satisfied.

As another example, if an indicator indicating that there is no additional stream to be transmitted to the reception apparatus during the remainder of the TXOP is received, the third criterion may be satisfied. In this example, the transmission apparatus may transmit a data stream to the reception apparatus during the TXOP, and when the transmission apparatus has completed the transmission of the data stream to the reception apparatus, the transmission apparatus may notify the reception apparatus that transmission is completed using the indicator. As a result, the reception apparatus may enter a sleep state for the remainder of the TXOP.

The reception apparatus may selectively determine whether to change the operation state of the reception apparatus based on the first criterion and the second criterion, using an enabling bit included in each of frames transmitted from the transmission apparatus.

In response to at least one of the predetermined criterion being satisfied based on information transmitted from the transmission apparatus in 260, the reception apparatus changes the operation state of the reception apparatus from the awake state to the sleep state, in 270. For example, the reception apparatus may save receive standby power and decrease power consumption for receiving data by maintaining the sleep state for the remainder of the TXOP.

Conversely, if the predetermined criterion is not satisfied, the reception apparatus maintains the operation state of the reception apparatus in the awake state, in 280.

Figure 3:
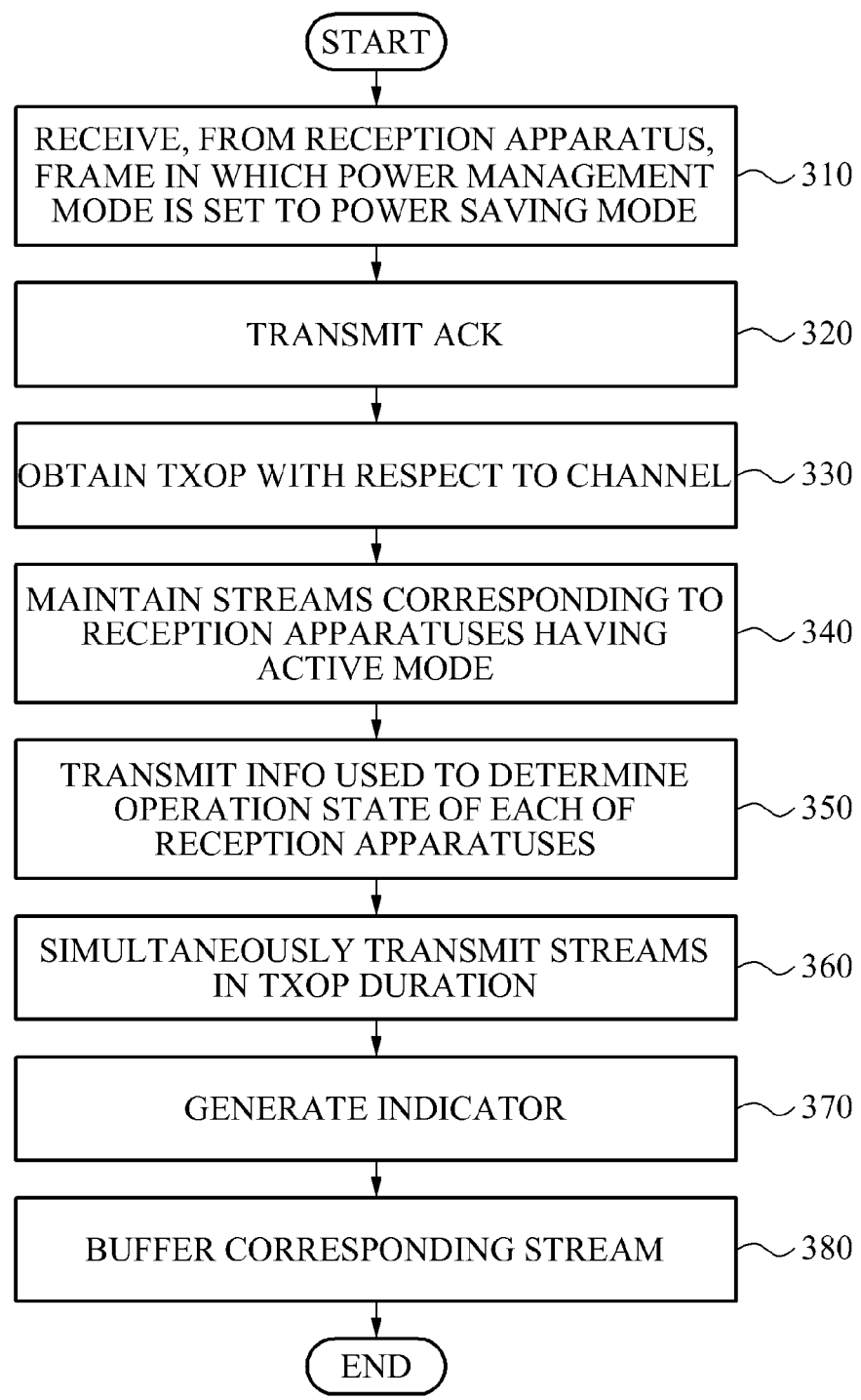
FIG. 3 is a flowchart illustrating an example of a communication method of a transmission apparatus.

FIG. 3 illustrates an example of a communication method of a transmission apparatus.

In 310, the transmission apparatus receives a frame in which a power management mode is set to a power saving mode, from a reception apparatus that is to operate in the power saving mode from among one or more reception apparatuses having an active mode as the power management mode.

In 320, the transmission apparatus transmits an ACK to the reception apparatus in response to the frame in which the power management mode is set to the power saving mode.

In 330, the transmission apparatus obtains a TXOP with respect to a channel.

In 340, the transmission apparatus maintains streams corresponding to reception apparatuses that have the active mode as a power management mode.

In operation 350, the transmission apparatus transmits information that may be used by the reception apparatuses to determine an operation state of each of the reception apparatuses.

For example, information that may be used by the reception apparatuses to determine the operation state of each of the reception apparatuses may include at least one of a group ID of a group including each of the reception apparatuses that the transmission apparatus may send data to such as the reception apparatuses in a corresponding cell, information about whether a stream corresponding to each of the reception apparatuses is to be transmitted from the transmission apparatus during the TXOP, and information indicating whether there is an additional stream to be transmitted to the reception apparatuses during the TXOP.

In 360, the transmission apparatus simultaneously transmits the streams to at least one of the reception apparatuses during the TXOP.

For example, 'simultaneously' transmitting the streams may indicate that the streams are simultaneously transmitted in a spatial aspect or are transmitted using a multi-user multiple input multiple output (MU-MIMO) communication, and may not indicate that transmission of streams corresponding to at least one terminal simultaneously starts and is simultaneously completed.

The transmission apparatus may not transmit a stream corresponding to the reception apparatus that is in the sleep state. For example, the reception apparatuses satisfying the predetermined criterion may maintain the operation state as the sleep state for the remainder of the TXOP duration.

For example, information used to determine the operation state and the streams may be included in the same frame.

The predetermined criterion may include a first criterion, a second criterion, and a third criterion. When the reception apparatus is not included in the group of the group ID including a set of reception apparatuses within a corresponding cell, the first criterion may be satisfied. When the reception apparatus is included in the group of the group ID, but a stream corresponding to the reception apparatus is not to be transmitted from the transmission apparatus during the TXOP, the second criterion may be satisfied. When an indicator indicating that there are no more additional streams to be transmitted to the reception apparatus during the remainder of the TXOP, the third criterion may be satisfied.

The group of the group ID may include the set of reception apparatuses within a corresponding cell.

The transmission apparatus may transmit a frame including an enabling bit enabling the reception apparatus to selectively determine whether to change the operation state of the reception apparatus based on the first criterion and/or the second criterion.

In 370, the transmission apparatus generates an indicator indicating that there is no additional stream to be transmitted to the reception apparatus during the TXOP.

For example, in 370, the transmission apparatus may generate the indicator indicating that there is no additional stream to be transmitted to the reception apparatus using a preamble of a packet transmitted to the reception apparatus or a header of a media access control (MAC) frame transmitted to the reception apparatus. For example, the indicator may be a more data bit (MDB) of the MAC header.

In 380, the transmission apparatus buffers a stream that is to be transmitted to a reception apparatus for the remainder of the TXOP duration. For example, a TXOP may be cut short for various unforeseen reasons, and the reception apparatus may still be in a sleep state for the remainder of the TXOP which was cut short. Therefore, the transmission apparatus may buffer data that is to be sent to the reception apparatus.

For example, when the reception apparatus desires to operate in the power saving mode, the reception apparatus may transmit, to the transmission apparatus, a frame in which a power management mode is set to the power saving mode. The transmission apparatus may transmit an ACK to the reception apparatus in response to the frame.

In response, the transmission apparatus may transmit, to the reception apparatus, information about the TXOP such as the Group ID, whether there is a data stream for the reception apparatus, and whether there is an additional data stream for the reception apparatus. The reception apparatus may determine whether the predetermined criterion is satisfied based on the information. In this example, because the information is transmitted from the transmission apparatus, the transmission apparatus also may know whether the predetermined criterion is satisfied for each respective reception apparatus.

Accordingly, even if the reception apparatus does not transmit additional information that the reception apparatus is going to enter into the sleep state, the transmission apparatus may recognize that the reception apparatus is going to enter into the sleep state.

Figure 4:
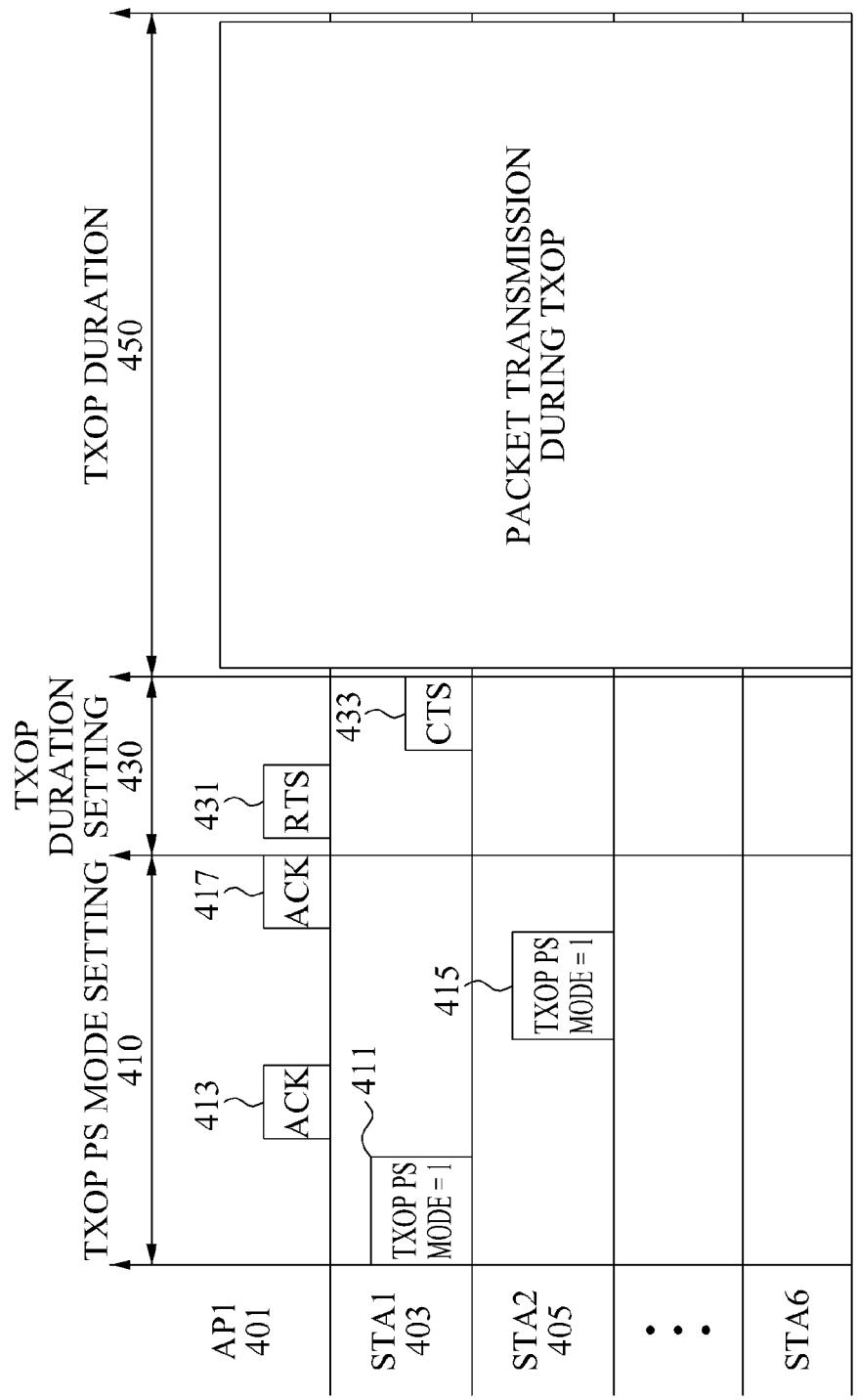
FIG. 4 is a diagram illustrating an example of a reception apparatus setting a power management mode to a power saving mode.

FIG. 4 illustrates an example of a reception apparatus setting a power management mode to a power saving mode.

Hereinafter, STA may indicate, for example, a reception apparatus, a terminal, a station, and the like, and AP may indicate, for example, a transmission apparatus, an access point, and the like.

An STA (1) 403 desiring to operate in a power saving mode may transmit, to an AP (1) 401, a frame 411 in which a power saving mode, that is, a TXOP PS mode, is set to '1'. In this example, setting of the power saving mode to '1' may indicate that a corresponding STA sets the power management mode of the corresponding STA to the power saving mode. The corresponding STA may use, for example, a capabilities/support field of an association request frame to set the power management mode of the STA to indicate that the STA desires to operate in power saving mode.

The STA (1) 403 may receive an ACK 413 from the AP (1) 401 as a response to the frame 411.

After receiving the ACK 413, the STA (1) 403 may operate in the power saving mode.

Similarly, an STA (2) 405 may transmit, to the AP (1) 401, a frame 415 in which the power saving mode is set to '1', and may operate in the power saving mode after receiving an ACK 417 from the AP (1) 401.

The STA (1) 403 and the STA (2) 405 may be set to operate in the power saving mode by performing the aforementioned operation as the AP (1) 401 in a TXOP PS mode setting period 410.

In a TXOP duration setting period 430, the AP (1) 401, the STA (1) 403, and the STA (2) 405 may set a TXOP duration 450 using a request to send (RTS) frame 431 and a clear to send (CTS) frame 433.

The TXOP duration setting period 430 may correspond to a TXOP setting period which is further described later.

The RTS frame 431 and the CTS frame 433 may be used to prevent a frame collision known as a hidden node issue. A process may be initiated by transmitting, by a node, for example, the AP (1) 401 desiring to transmit data, the RTS frame 431. In the case of a wireless environment in which a transmission is possible because other signals are not being transmitted, the STA (1) 403 corresponding to a destination node may transmit the CTS frame 433 as a response to the signal.

The other nodes receiving the RTS frame 431 or the CTS frame 433 may solve the hidden node issue by limiting a data transmission for a predetermined amount of time. The predetermined amount of time may be included in the RTS frame 431 and the CTS frame 433.

Figure 5:
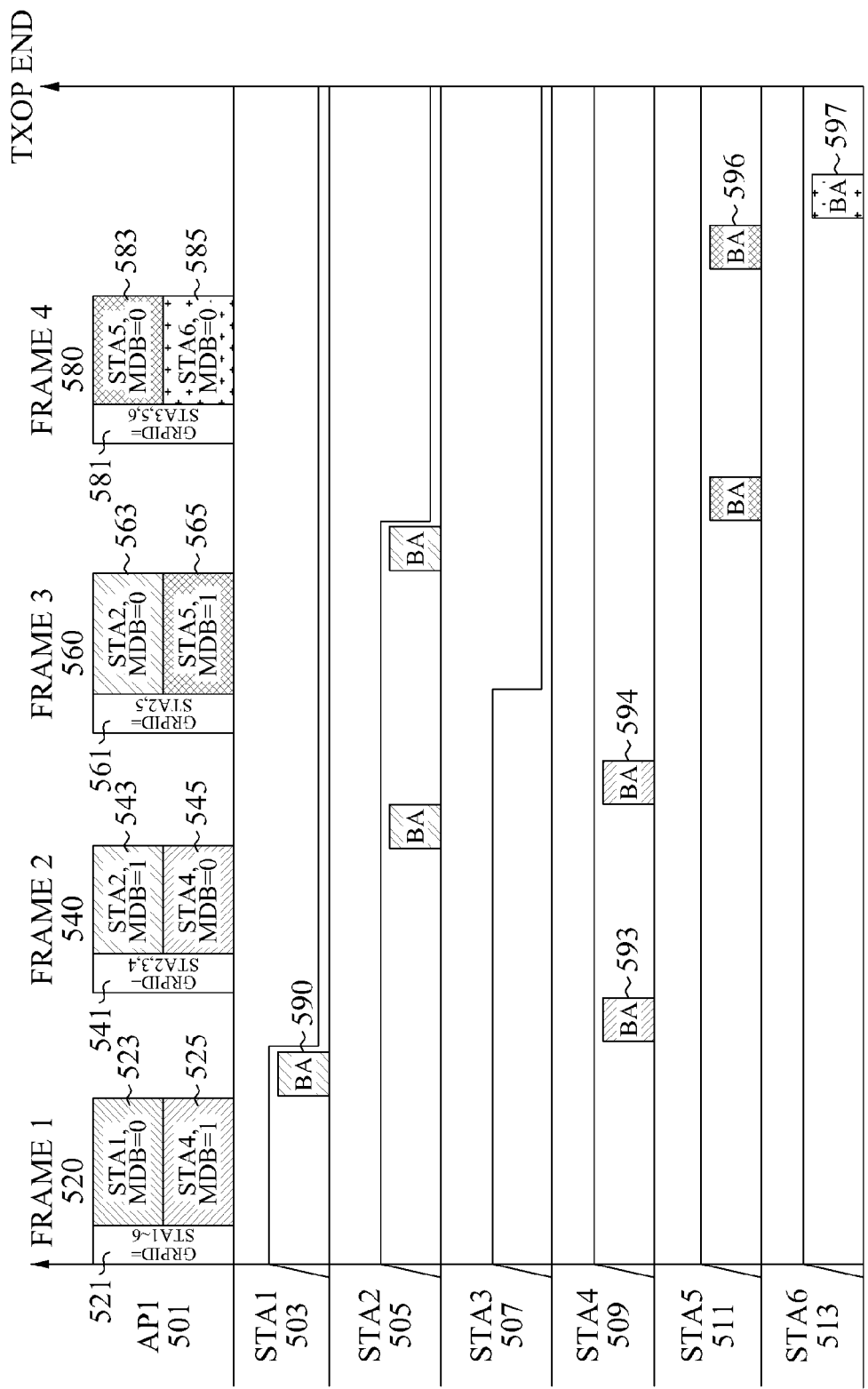
FIG. 5 is a diagram illustrating an example of a frame transmitted and received during a TXOP.

FIG. 5 illustrates an example of a frame transmitted and received during a TXOP. In this example, the second criterion is not considered.

Referring to FIG. 5, an AP (1) 501 and six STAs, for example, an STA (1) 503, an STA (2) 505, an STA (3) 507, an STA (4) 509, an STA (5) 511, and an STA (6) 513 are present within a single cell or a basic service set (BSS), and the six STAs are shown in Table 1.

TABLE 1

|  | Apparatuses using TXOP PS mode | Apparatuses using non-TXOP PS mode |
|---|---|---|
| Data in buffer | STA 1, STA 2 | STA 4, STA 5, STA 6 |
| No data | STA 3 | N/A |

Referring to Table 1, among the six STAs, the STA (1) 503, the STA (2) 505, and the STA (3) 507 correspond to terminals in a power saving mode, that is, a TXOP PS mode 140 illustrated in FIG. 1.

In this example, the AP (1) 501 has data to transmit to the STA (1) 503, the STA (2) 505, the STA (4) 509, the STA (5) 511, and the STA (6) 513.

Referring to FIG. 5, Frame (1) 520 includes all the stations, that is, the STA (1) 503, the STA (2) 505, the STA (3) 507, the STA (4) 509, the STA (5) 511, and the STA (6) 513, in a group of a group ID included in a preamble 521. Accordingly, after receiving the frame (1) 520, the first criterion is not satisfied for any STA.

Frame (1) 520 includes data 523 to be transmitted to the STA (1) 503, and data 525 to be transmitted to the STA (4) 509, and an MDB of the STA (1) 503 is set to '0'.

The MDB of the STA (1) 503 is set to '0' which in this example indicates that there is no more data to be additionally transmitted from the AP (1) 501 to the STA (1) 503. Accordingly, the STA (1) 503 may transmit a block acknowledgement (BA) 590 to the AP (1) 501 and then operate in the power saving mode until the end of the TXOP, thereby reducing a standby power consumption. An example of the power saving state is a sleep state or a doze state.

After completing reception of a corresponding stream based on the MDB, or after transmitting the BA 590 with respect to the corresponding stream, the STA (1) 503 may maintain the operation state of the STA (1) 503 in a sleep state for the remaining time of the TXOP duration.

Frame (2) 540 includes the STA (2) 505, the STA (3) 507, and the STA (4) 509 in a group of a group ID included in a preamble 541, and includes data 543 to be transmitted to the STA (2) 505 and data 545 to be transmitted to the STA (4) 509.

The STA (3) 507 in the power saving mode, that is, the TXOP PS mode does not have data to receive from the AP (1) 501, however, is included in the group ID. Accordingly, the STA (3) 507 may not enter the sleep state. That is, in the example of FIG. 5, the STAs do not consider the second criterion, but only consider the first and third criterion.

In frame (2) 540, an MDB of the STA (2) 505 is set to '1' and thus, STA (2) 505 may remain in an awake state.

In frame (2) 540, an MDB of the STA (4) 509 is set to '0', however, STA (4) 509 is in non-TXOP PS mode and does not use the power saving mode. Accordingly, even after transmitting, to the AP (1) 501, BAs 593 and 594 in response to the frame (1) 520 and the frame (2) 540, the STA (4) 509 may remain in the awake state instead of saving power.

Frame (3) 560 includes the STA (2) 505 and the STA (5) 511 in a group of a group ID included in a preamble 561, and includes data 563 to be transmitted to the STA (2) 505 and data 565 to be transmitted to the STA (5) 511.

The STA (3) 507 operating in the power saving mode is included in a group of a group ID of a frame (4) 580, and therefore, the first criterion is satisfied for the STA (3) 507. Thus, the STA (3) 507 may enter into a power saving mode for the remainder of the TXOP.

In the example of FIG. 5, operating in the power saving mode may indicate remaining in the sleep state.

In frame (3) 560, the MDB of the STA (2) 505 is set to '0' and thus, the STA (2) 505 may enter into the power saving mode and may maintain the sleep state for the remainder of the TXOP duration.

Frame (4) 580 includes the STA (5) 511 and the STA (6) 513 in a group of a group ID included in a preamble 581, and includes data 583 to be transmitted to the STA (5) 511 and data 585 to be transmitted to the STA (6) 513. Even though frame (4) 580 includes the STA (3) 507, the STA (3) 507 is already in the sleep state. Accordingly, the STA (3) 507 may continuously maintain the sleep state during the TXOP duration.

The STA (5) 511 and the STA (6) 513 may receive frame (4) 580 and may transmit BAs 596 and 597 to the AP (1) 501.

The AP (1) 501 may include any STAs in a group of a group ID of a frame to be transmitted. However, STAs that are in the sleep state may not receive a corresponding frame. Accordingly, the AP (1) 501 may buffer data to be transmitted while a corresponding STA is in the sleep state.

Figure 6:
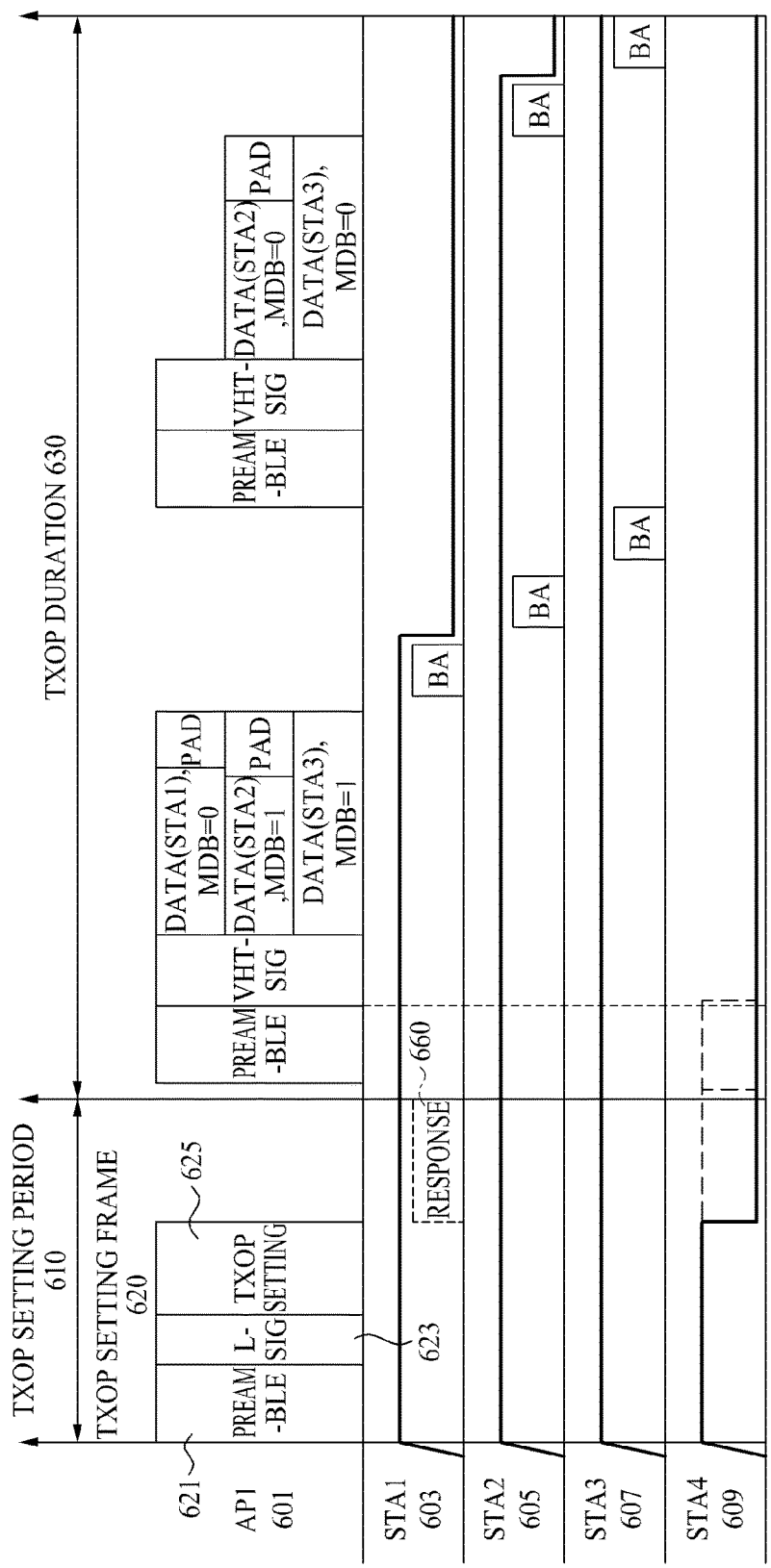
FIG. 6 is a diagram illustrating an example of a TXOP setting frame and a TXOP duration.

FIG. 6 illustrates an example of a TXOP setting frame and a TXOP duration.

Referring to FIG. 6, an AP (1) 601 may set a time duration corresponding to a TXOP with respect to a channel. For example, the AP (1) 601 may set a TXOP duration 630 by transmitting a TXOP setting frame 620 in a TXOP setting period 610.

The TXOP setting frame 620 may include information used to set the time duration corresponding to the TXOP duration 630. The TXOP setting frame 620 may be transmitted in a form that may be overheard by all the STAs within a cell or a BSS. For example, the STAs may include reception apparatuses having set a power management mode to a power saving mode such as a sleep state, and reception apparatuses having not set the power management mode to the power saving mode such as in the awake state.

For example, a multi-user precoding scheme and the like may not be applied to the TXOP setting frame 620. The TXOP setting frame 620 may be generated to be decodable by all the STAs within the cell even those STAs that are in a sleep state.

The TXOP setting frame 620 may include information about whether to apply the power saving mode, or a target reception group that is a transmission target of a frame during the corresponding TXOP duration 630. Information associated with the target reception group may include a predetermined group that have the same group ID and STAs belonging to the predetermined group.

When the TXOP setting frame 620 includes information associated with the target reception group, STAs excluded from a corresponding reception group may maintain the sleep state by the end of the TXOP duration 630 after receiving the TXOP setting frame 620.

A single STA or STAs belonging to the target reception group may transmit a response frame 660 with respect to the TXOP setting frame 620. For example, the response frame 660 may include a portion of or all of descriptions included in the TXOP setting frame 620.

Accordingly, hidden nodes not receiving the TXOP setting frame 620 may set a TXOP. When at least one STA transmits the response frame 660, the at least one STA may transmit the response frame 660 according to a predetermined order and a predetermined method. Otherwise, corresponding information may be included in the TXOP setting frame 620.

The TXOP setting period 610 may be used to set the time duration corresponding to the TXOP with respect to the channel, for example, the TXOP duration 630.

As an example, in the TXOP setting period 610 for setting the TXOP duration 630, the AP (1) 601 may transmit the TXOP setting frame 620 to an STA (1) 603, an STA (2) 605, an STA (3) 607, and an STA (4) 609 within a cell.

The TXOP setting frame 620 may be used for a corresponding reception apparatus to receive a corresponding stream in the TXOP duration 630, or to operate in the power saving mode.

For example, the TXOP setting frame 620 may include a preamble 621, a legacy signal field (L-SIG) 623, and TXOP setting information 625 for setting the TXOP duration 630.

Each of the STA (1) 603, the STA (2) 605, the STA (3) 607, and the STA (4) 609 may set the time duration corresponding to the TXOP with respect to the channel, based on the TXOP setting information 625.

In this example, each of the STA (1) 603, the STA (2) 605, and the STA (3) 607 are to receive data from the AP (1) 601 and may access a radio channel in the TXOP duration 630 to receive a packet or a frame from the AP (1) 601.

However, the STA (4) 609 is not to receive data from the AP (1) 601 and may not access the radio channel in the TXOP duration 630.

The TXOP setting information 625 may include information associated with a group of STAs to receive the data from the AP (1) 601 among the STA (1) 603, the STA (2) 605, the STA (3) 607, and the STA (4) 609.

Each of the STA (1) 603, the STA (2) 605, the STA (3) 607, and the STA (4) 609 may set the TXOP duration 630 based on the TXOP setting information 625. In the TXOP duration 630, data transmission may be performed between the AP (1) 601 and each of the STA (1) 603, the STA (2) 605, the STA (3) 607, and the STA (4) 609 using a method similar to the method described above with reference to FIG. 5.

The STA (1) 603 to receive data from the AP (1) 601 may transmit, to the AP (1) 601, the response frame 660 with respect to the TXOP setting information 625. The response frame 660 with respect to the TXOP setting information 625 may prevent entangling of the STA (1) 603, the STA (2) 605, the STA (3) 607, and the STA (4) 609 when coverages of a plurality of APs are overlapped with each other.

Figure 7:
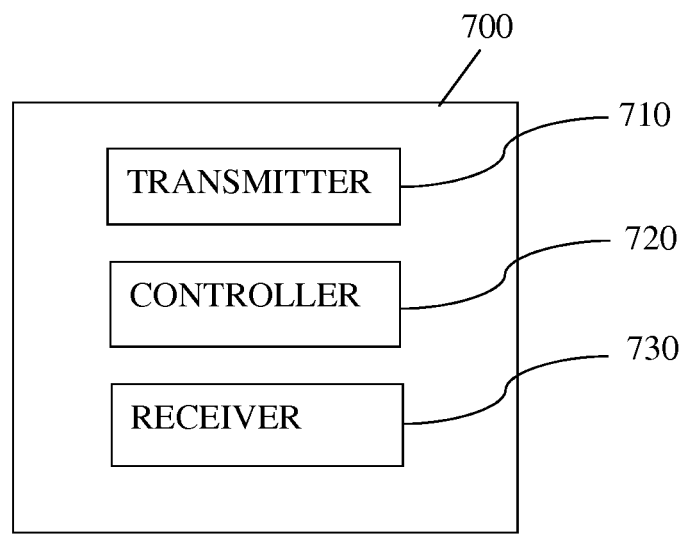
FIG. 7 is a diagram illustrating an example of a reception apparatus.

FIG. 7 illustrates an example of a reception apparatus.

Referring to FIG. 7, reception apparatus 700 includes a transmitter 710 for transmitting data, a controller 720 for controlling the operation of the reception apparatus 700, and a receiver 730 for receiving data.

The reception apparatus 700 is capable of determining a power management mode to operate in during a transmission opportunity (TXOP) of a transmission apparatus. For example, the power management mode may include at least one of a non-power saving mode (non-TXOP PS mode) and a power saving mode (TXOP PS mode).

The controller 720 may determine whether the reception apparatus 700 is to operate in the power saving mode (TXOP PS mode) or the non-power saving mode (non-TXOP PS mode). In response to determining that the reception apparatus 700 is to operate in TXOP PS mode, the controller 720 may set power management field of the frame to indicate that the reception apparatus 700 desires to operate in TXOP PS mode.

For example, the frame may be an association request frame, and the controller 720 may set a capabilities/support field of the association request frame to indicate whether the reception apparatus 700 desires to operate in TXOP PS mode or in non-TXOP PS mode.

The transmitter 710 may transmit the frame to the transmission apparatus in which the frame indicates whether the reception apparatus 700 desires to operate in the TXOP PS mode or the non-TXOP PS mode.

In response to receiving the frame from the reception apparatus 700, the transmission apparatus may transmit an acknowledgment message (ACK) to the reception apparatus 700. The a receiver 730 may receive the acknowledgment (ACK) from the transmission apparatus in response to the association request frame transmitted from transmitter 710.

In response to the receiver 730 receiving the ACK from the transmission apparatus, the controller 720 may set the power management mode of the reception apparatus 700 to the TXOP PS mode, and if the receiver 730 does not receive the ACK from the transmission apparatus, the controller 720 may set the power management mode of the reception apparatus 700 to the non-TXOP PS mode.

Figure 8:
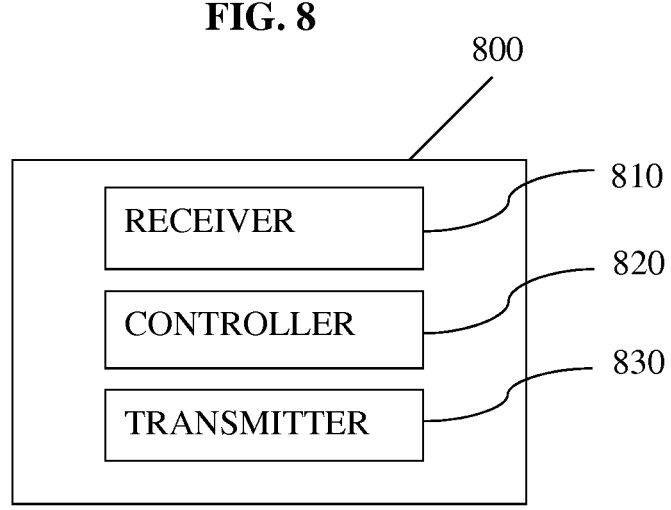
FIG. 8 is a diagram illustrating an example of a transmission apparatus.

FIG. 8 illustrates an example of a transmission apparatus.

Referring to FIG. 8, transmission apparatus 800 includes a receiver 810 for receiving data, a controller 820 for controlling the transmission apparatus 800, and a transmitter 830 for transmitting data.

The transmission apparatus 800 may transmit data to one or more terminals during a transmission opportunity (TXOP). The receiver 810 may receive a frame in which a power management mode is set to a power saving mode (TXOP PS mode). For example, the receiver 810 may receive a frame from a reception apparatus. The frame may be an association request frame, and a capabilities/support field of the association request frame may be set to indicate that the reception apparatus desires to operate in TXOP PS mode.

The controller 820 may determine if the transmission apparatus 800 is capable of supporting the TXOP PS mode. In response to determining that the transmission apparatus 800 is capable of supporting the TXOP PS mode, the transmitter 830 may transmit an acknowledgment message to the reception apparatus.

It should be appreciated that the examples described with reference to FIGS. 1-6 are also applicable to the reception apparatus 700 and the transmission apparatus 800 described with reference to FIGS. 7 and 8. Further description thereof is omitted for concision. According to various aspects, reception apparatuses desiring to operate in a power saving mode among reception apparatuses operating in an active mode may transmit a frame in which a power management mode is set to the power saving mode and thereby be enabled to selectively determine whether to operate in the power saving mode.

According to various aspects, when there is no data stream pending for a reception apparatus operating in a power saving mode, it is possible to decrease a receive standby power by maintaining an operation state of the corresponding reception apparatus in a sleep state during the TXOP or for the remainder of the TXOP.

According to various aspects, when a reception apparatus operating in a power saving mode satisfies a predetermined criterion, it is possible to decrease power consumption by changing an operation state of the corresponding reception apparatus from an awake state to a sleep state.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and non-transitory computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of an access point, comprising:
receiving, from a terminal, an association request frame comprising information of whether the terminal enables a power saving mode for a transmission opportunity (TXOP) duration; and
transmitting, to the terminal, information of whether the access point supports the power saving mode in response to the association request frame,
wherein the power saving mode indicates whether an operate state of the terminal is changable during the TXOP duration.

2. The method of claim 1, further comprising:
transmitting, to the terminal, a data frame comprising a very high throughput signal (VHT-SIG) field and a medium access control (MAC) header.

3. The method of claim 2, wherein the VHT-SIG field includes a group identifier (ID).

4. The method of claim 2, wherein the VHT-SIG field includes information of a number of streams intended for the terminal.

5. The method of claim 2, wherein the MAC header includes information of additional data to be transmitted to the terminal.

6. A communication method of an access point, comprising:
transmitting, to a terminal, information of whether the access point supports a power saving mode for a transmission opportunity (TXOP) duration; and
receiving, from the terminal, an association request frame comprising information of whether the terminal enables the power saving mode for the TXOP duration,
wherein the power saving mode indicates whether an operate state of the terminal is changable during the TXOP duration.

7. An access point, comprising:
a receiver configured to receive, from a terminal, an association request frame comprising information of whether the terminal enables a power saving mode for a transmission opportunity (TXOP) duration; and
a transmitter configured to transmit, to the terminal, information of whether the access point supports the power saving mode in response to the association request frame,
wherein the power saving indicates whether an operate state of the terminal is changable during the TXOP duration.

8. The access point of claim 7, wherein the transmitter is further configured to transmit, to the terminal, a data frame comprising a very high throughput signal (VHT-SIG) field and a medium access control (MAC) header.

9. The access point of claim 8, wherein the VHT-SIG field includes a group identifier (ID).

10. The access point of claim 8, wherein the VHT-SIG field includes information of a number of streams intended for the terminal.

11. The access point of claim 8, wherein the MAC header includes information of additional data to be transmitted to the terminal.

12. An access point, comprising:
a transmitter configured to transmit, to a terminal, information of whether the access point supports a power saving mode for a transmission opportunity (TXOP) duration; and
a receiver configured to receive, from the terminal, an association request frame comprising information of whether the terminal enables the power saving mode for the TXOP duration,
wherein the power saving mode indicates whether an operate state of the terminal is changable during the TXOP duration.

* * * * *

UNITED STATES PATENT AND TRADEMARK OFFICE
CERTIFICATE OF CORRECTION

PATENT NO.        : 9,635,611 B2
APPLICATION NO.   : 14/602798
DATED             : April 25, 2017
INVENTOR(S)       : Ui Kun Kwon et al.

It is certified that error appears in the above-identified patent and that said Letters Patent is hereby corrected as shown below:

In the Claims

In Claim 1, Column 16, Line 5, should read:
--- operate state of the terminal is changeable during the ---

In Claim 6, Column 16, Line 28, should read:
--- operate state of the terminal is changeable during the ---

In Claim 7, Column 16, Line 40, should read:
--- state of the terminal is changeable during the TXOP ---

In Claim 12, Column 16, Line 64, should read:
--- operate state of the terminal is changeable during the ---

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*